(12) United States Patent
Huang et al.

(10) Patent No.: US 7,562,568 B2
(45) Date of Patent: Jul. 21, 2009

(54) TIRE PARAMETER SENSOR UNIT WITH REAL TIME DATA STORAGE

(75) Inventors: Su Shiong Huang, Belleville, WA (US); Shengbo Zhu, San Jose, CA (US)

(73) Assignee: Silicon Valley Micro C Corp., San Jose, CA (US)

( * ) Notice: Subject to any disclaimer, the term of this patent is extended or adjusted under 35 U.S.C. 154(b) by 0 days.

(21) Appl. No.: 11/999,782

(22) Filed: Dec. 8, 2007

(65) Prior Publication Data

US 2009/0145216 A1      Jun. 11, 2009

(51) Int. Cl.
*B60C 23/02* (2006.01)
(52) U.S. Cl. .......................... 73/146.5; 73/146
(58) Field of Classification Search ........ 73/146–146.8; 340/442–447
See application file for complete search history.

(56) References Cited

U.S. PATENT DOCUMENTS

| | | | | |
|---|---|---|---|---|
| 6,087,930 | A * | 7/2000 | Kulka et al. ................. | 340/447 |
| 6,371,178 | B1 * | 4/2002 | Wilson ..................... | 152/152.1 |
| 6,945,103 | B1 * | 9/2005 | Lee et al. ................... | 73/146.5 |
| 7,385,485 | B2 * | 6/2008 | Thomas et al. ......... | 340/426.33 |
| 2006/0090558 | A1 * | 5/2006 | Raskas ........................ | 73/146 |

* cited by examiner

*Primary Examiner*—Lisa M Caputo
*Assistant Examiner*—Jermaine Jenkins

(57) ABSTRACT

A tire parameter sensor unit for monitoring one or more vehicle tire parameters such as internal tire pressure and temperature and developing a permanent log of the operational history of the tire. The sensor unit has a power system, a processor/transmitter, a radio time clock, one or more sensors, and a memory mounted on a substrate. This assembly is permanently attached to the tire in the side wall or tread wall. Initial tire identification information is stored in the memory upon tire fabrication. During the lifetime of the tire, operational information specifying the tire operating conditions (pressure, temperature, etc.) is permanently stored in the memory along with real time data. The operational information and real time data can be read out from memory to provide the history log.

17 Claims, 4 Drawing Sheets

US 7,562,568 B2

TIRE PARAMETER SENSOR UNIT WITH REAL TIME DATA STORAGE

BACKGROUND OF THE INVENTION

This invention relates to automotive tire parameter monitoring systems. More particularly, this invention relates to a tire parameter sensor unit having a real time tire parameter storage capability for accumulating information relevant to a given tire.

Tire parameter monitoring systems are known and are commonly used to monitor one or more parameters of interest in individual pneumatic tires of a vehicle and to provide an advisory signal to the driver, or an on-board computer system, whenever the monitored parameter in one or more of the vehicle tires reaches a value lying outside of a predetermined safe range. The parameter is typically internal tire pressure, tire temperature, internal tire air temperature, lateral tire force, or some other parameter of interest. The advisory signal is typically generated by an r.f. signal generator/transmitter controlled by a microprocessor connected to the tire parameter sensor(s), the advisory signal being generated whenever the tire parameter measured by a given sensor lies outside a predetermined normal operating range, signifying either a high or a low parameter condition. This r.f. signal is transmitted to a vehicle-mounted receiver, which uses the advisory signal to alert the driver either visually (by activating a warning lamp or display) or audibly (by activating an audible alarm) or both. Electrical power to the sensor unit comprising the parameter sensor(s), the microprocessor, the r.f signal generator/transmitter, and any ancillary circuitry is usually provided by a battery or an inductive power source. The sensor unit components and the power source are typically all mounted on a substrate and encapsulated by a suitable protective material.

Due to concern for automotive safety, and spurred on by increasingly stringent governmental regulations, tire parameter monitoring system technology has advanced to a stage at which a complete sensor unit can be installed in a tire at the point of manufacture by embedding the sensor unit in the tire carcass. Such a sensor unit includes a non-volatile memory in which tire information is stored at the point of manufacture. The stored tire information may include the date of manufacture, tire type, place of manufacture, and tire serial number, and this information is normally stored in read-only form so that it cannot be altered. Once installed, the sensor unit can be interrogated in the future by special purpose interrogator devices to retrieve the stored information usually by using well-known r.f. interrogation techniques. Thus, for example, when a given tire equipped with such a sensor unit fails, or is replaced, the stored and extracted information can be useful in determining tire lifetime, tire failure rate for an identifiable tire manufacturing run, and tire failure rate for a given tire design. Since the sensor unit is physically incorporated into the tire, tampering is virtually impossible without destroying the tire so that the information extracted from a given sensor unit is virtually guaranteed to accurately reflect the origin of the tire to which the sensor unit is attached.

Tire parameter sensor units having the stored tire information capability only carry original point of manufacture information. While useful, this information falls short of providing any information concerning the tire after manufacture, especially information pertaining to the actual use of the tire after it has been manufactured and placed in the stream of commerce.

SUMMARY OF THE INVENTION

The invention comprises a tire parameter sensor unit which is capable of storing real time data relating to tire performance so that an operational history of the associated tire is developed over the life of the tire.

From an apparatus standpoint, the invention comprises a tire parameter sensor unit for accumulating a vehicle tire history log of operational tire information during use. The sensor unit comprises a substrate; a tire parameter sensor carried by the substrate for providing monitoring signals representative of the value of a tire parameter; a radio clock unit carried by the substrate for generating real time clock signals; a memory carried by the substrate; a processor/transmitter unit carried by the substrate and coupled to the sensor and the radio clock unit for storing the monitoring signals in the memory along with the real time clock signals and for converting the monitoring signals to transmission signals; and a power system carried by the substrate for supplying electrical power to the tire parameter sensor, the radio clock unit, the memory and the processor/transmitter unit.

The invention further preferably includes a receiver unit coupled to the processor/transmitter unit for enabling remote interrogation of the memory so that the stored information can be remotely accessed for analysis.

The processor/transmitter unit includes preferably includes means for storing tire history information received by the receiver unit in the memory so that initial tire information, such as place of manufacture, tire type designation, tire serial number, and tire production run information are contained in the memory for future reference.

The power system may comprise either a battery or an inductive power source. When the inductive power source is used, this element preferably includes a coil for generating tire rotation analog pulse signals during tire motion. These analog pulse signals are supplied to an analog-to-digital converter having an input coupled to the coil and an output coupled to the processor/transmitter unit for converting said analog pulse signals to digital equivalent signals. The processor/transmitter unit includes means for converting these digital equivalent signals to tire mileage information signals and means for storing the tire mileage information signals in the memory so that the tire parameter sensor unit cumulatively stores the actual running tire mileage without the need for any additional circuitry on the associated vehicle.

The sensor unit may include at least two tire parameter sensors carried by the substrate for providing monitoring signals representative of the value of at least two different tire parameters.

The tire parameter sensor unit is preferably mounted within the associated tire: either in a side wall of the tire or within the tread wall of the tire.

From a process standpoint, the invention comprises a method of creating a vehicle tire history log of operational tire information during use, the method comprising the steps of:
  (a) attaching a tire parameter sensor unit to a tire, the sensor unit having a substrate; a tire parameter sensor carried by the substrate; a radio clock unit carried by the substrate; a memory carried by the substrate; a processor/transmitter unit carried by the substrate and coupled to the sensor and the radio clock unit; and for converting the monitoring signals to transmission signals; and a power system carried by the substrate for supplying electrical power to the tire parameter sensor, the radio clock unit, the memory and the processor/transmitter unit;

(b) applying electrical power from the power system to the tire parameter sensor, the radio clock unit, the memory, and the processor/transmitter unit;

(c) operating the tire parameter sensor to generate monitoring signals representative of the value of a tire parameter;

(d) operating the radio clock unit to generate real time clock signals; and (e) operating the processor/transmitter unit to store the monitoring signals in the memory along with the real time clock signals.

The method further preferably includes the step of operating the processor/transmitter unit to convert the monitoring signals to transmission signals.

The method may further include the steps of providing initial tire identification information, and storing the initial tire identification information in the memory.

The method may further including the steps of providing a coil for generating tire rotation analog pulse signals during tire motion; providing an analog-to-digital converter having an input coupled to the coil and an output coupled to the processor/transmitter unit for converting the analog pulse signals to digital equivalent signals; providing the processor/transmitter unit with means for converting the digital equivalent signals to tire mileage information signals and means for storing the tire mileage information signals in the memory; operating the analog-to-digital converter to produce the digital equivalent signals; operating the processor/transmitter unit to generate the tire mileage information signals; and operating the processor/transmitter unit to store the tire mileage information signals in the memory.

The method may further include the steps of providing a receiver unit coupled to the processor/transmitter unit for enabling remote interrogation of the memory; and operating the receiver unit and the processor/transmitter unit to convert the monitoring signals and the real time clock signals stored in the memory to transmission signals.

The method further includes the step of mounting the tire parameter sensor unit within the side wall of a vehicle tire. In the alternative, the method further includes the step of mounting the tire parameter sensor unit within the tread wall of a vehicle tire The method may further include the steps of providing at least two tire parameter sensors carried by the substrate for providing monitoring signals representative of the value of at least two different tire parameters, and operating the at least two tire parameter sensors to generate monitoring signals representative of the value of at least two different tire parameters.

The invention provides a complete information log of a tire to which the tire parameter sensor unit is permanently attached. This information log may include the initial tire information noted above, as well as real time based operational information setting forth the parametric values of the tire parameters measured over the lifetime of the tire. This information can be extracted from the memory at any time and can be used to analyze the operating characteristics of the tire. In case of a tire failure, for example, the information log can be analyzed to determine whether extreme operating conditions were encountered in the tire when the failure occurred. The information log can also be used for warranty verification purposes, as well as tire performance purposes For a fuller understanding of the nature and advantages of the invention, reference should be made to the ensuing detailed description taken in conjunction with the accompanying drawings.

DETAILED DESCRIPTION OF THE PREFERRED EMBODIMENTS

Figure 1:
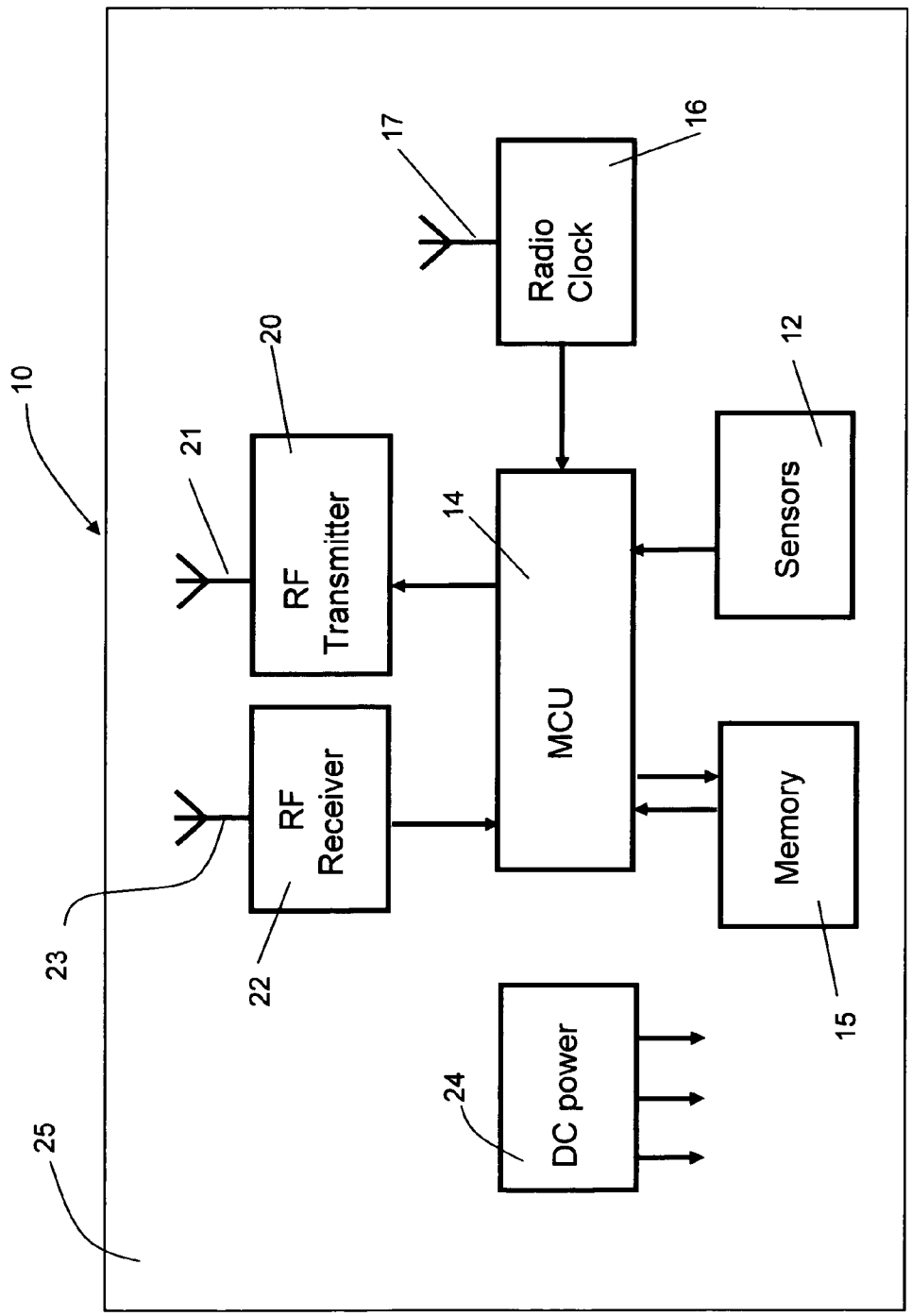
FIG. 1 is a schematic block diagram of a first embodiment of the invention.

Turning now to the drawings, FIG. 1 is a schematic block diagram of a first embodiment of the invention. As seen in this Fig., sensor unit 10 includes one or more tire parameter sensors collectively designated with reference numeral 12. Tire parameter sensor(s) 12 are known devices capable of measuring tire parameters such as internal tire pressure, internal tire air temperature, tire wall temperature, lateral tire displacement, and the like. Since such sensors are well known in the art, further description is omitted to avoid prolixity.

The output measuring signals provided by tire parameter sensor(s) 12 are coupled to the data input(s) of a microcomputer unit 14 having an associated memory 15. Microcomputer unit 14 samples these measurement signals and compares their values with pre-programmed reference values stored in memory 15. A radio clock unit 16 supplies real time signals to a data input of microcomputer unit 14. Radio clock unit 16 is a commercially available clock circuit that is synchronized by a time code bit stream transmitted by a radio transmitter connected to a time standard such as the NIST broadcasts in the United States of America, or any of the other known international time standard broadcasts. Radio clock unit 16 includes an antenna 17 for receiving the r.f. time code signal, and internal circuitry for converting the time code r.f. signal into a simple digital time code and decoding the time code bit stream to a form useable by microcomputer unit 14. One example of a suitable commercially available radio clock unit 16 is the model SM9501 A/B radio controlled clock receiver integrated circuit available from Seiko NPC Corporation. Other suitable commercially available devices will be apparent to those skilled in the art.

In addition to sampling the parameter measurement signals from sensor(s) 12 and the real time signals from radio clock unit 16, microcomputer unit 14 supervises and controls the operation of an r.f. transmitter 20 having an antenna 21. Transmitter 20 broadcasts advisory signals to a vehicle mounted r.f. receiver (not illustrated) in a conventional manner whenever one or more tire parameters is out of range. These advisory signals are processed by an on-board microprocessor to generate sensory warning signals to the vehicle driver, such as visible display signals or audible alarms. This operation is conventional and well understood by those of ordinary skill in the art.

An r.f. receiver unit 22 having an antenna 23 is coupled to microcomputer 14 and supplies interrogation signals thereto.

The interrogation signals are generated by either the on-board processor or a special interrogator unit described below. When queried by the on-board processor, the microcomputer responds in a known way by causing r.f. transmitter 20 to broadcast status signals indicating the status of the tire parameter sensor(s) 12 (i.e. operational or not) or signals representing the current value of the tire parameter(s) being monitored by the sensor(s) 12.

A D.C. power unit 24, typically a battery, supplies operating electrical power to the sensor(s) 12, microcomputer 14, memory 15, radio clock unit 16, r.f. transmitter 20 and r.f. receiver 22.

The active circuit elements and the D.C. power unit 24 shown in FIG. 1 are all mounted on a substrate 25. Substrate 25 is preferably fabricated from a relatively thin, flexible dielectric material, such as PTFE, possessing good bonding characteristics for the system components and compatible with internal mounting within a tire side wall. The complete sensor unit 10 is then incorporated into a vehicle tire in the manner described below.

Elements 14, 15, 20, and 22, and at least one of the sensor(s) 12, may all be incorporated into a single commercially available integrated circuit, such as a type NPX1 sensor available from GE Novasensor of Fremont, Calif.; or a type MPXY8300 tire pressure monitoring system available from Freescale Semiconductor, Inc. Memory 15 may comprise the memory internal to the above-noted integrated circuit, or may be a separate read/write memory integrated circuit.

Memory 15 is used to store the historical information for the tire to which the sensor unit 10 is permanently associated, as well as real time operational information pertaining to the associated tire. Initially, at the point of manufacture the special interrogator noted above broadcasts to r.f. receiver 22 the information concerning the tire origin: viz., place of manufacture, production run, tire type designation, tire serial number, and any other original information of interest. Radio clock unit 16 supplies the time and date that this original information is stored in memory 15. Microcomputer 14 processes this incoming information and the processed information is stored in memory 15 in a non-erasable manner. Thereafter, operational information is added to memory 15 using special interrogators and r.f. receiver 22 as the events occur, along with real time data supplied by radio clock unit 16. For example, when the associated tire is shipped to a distributor, this event can be recorded in memory 15 by broadcasting the information from a special interrogator unit to receiver 22 specifying the date and time of shipment, the destination distributor, the mode of transportation, etc. When the tire is received by the distributor, this event is logged into memory 15 in the same way. When the tire is shipped to a retailer, this event is likewise recorded in memory 15, noting the date, time, and dealer identification. When the tire is received by the retailer, this event can likewise be recorded in memory 15. When the tire is installed on a vehicle, this event can be recorded in memory 15, specifying the date, time, vehicle identification, and even the location of the wheel on which the tire is installed. Thereafter, real time data can be stored in memory 15 by the programmed operation of microcomputer 14. Such real time data specifies the operational condition of the tire at any time. For example, when the measured value(s) of the tire parameter(s) supplied by sensor(s) 12 to microcomputer 14 are out of range so that microcomputer 14 causes this information to be broadcast by r.f. transmitter 20 to the on-board processor, this same information can be stored in memory 15 along with the time and date supplied by radio clock unit 16. Such events accumulate in memory 15 so that, if the tire fails or is replaced due to minimal remaining tire tread, the accumulated information in memory 15 can be retrieved by a special interrogator and reviewed for quality control, warranty, and liability purposes.

Similarly, microcomputer 14 can be programmed to periodically or aperiodically sample the tire parameter value(s) currently measured by sensor(s) 12 and store these values in memory 15 along with the real time information supplied by radio clock unit 16 to create a running history of the operating conditions of the associated tire.

When the tire is relocated to a different position on the vehicle, this event can be recorded in memory 15 using a special interrogator to supply the information via r,f, receiver 22 and microcomputer 14 to memory 15.

In some applications it may be deemed desirable to record the actual mileage traveled by the associated tire. This can be done by supplying a real time signal to microcomputer 14 related to the circular motion of the associated tire. Such a signal is usually available in modern vehicles in the form of a pulse signal which is generated every complete revolution of a wheel. Knowing the wheel diameter, this pulse information can be readily converted to a lineal distance using known algorithms.

In summary, the invention enables the creation of a real time log of the entire history of the associated tire, from fabrication to disposal.

Figure 2:
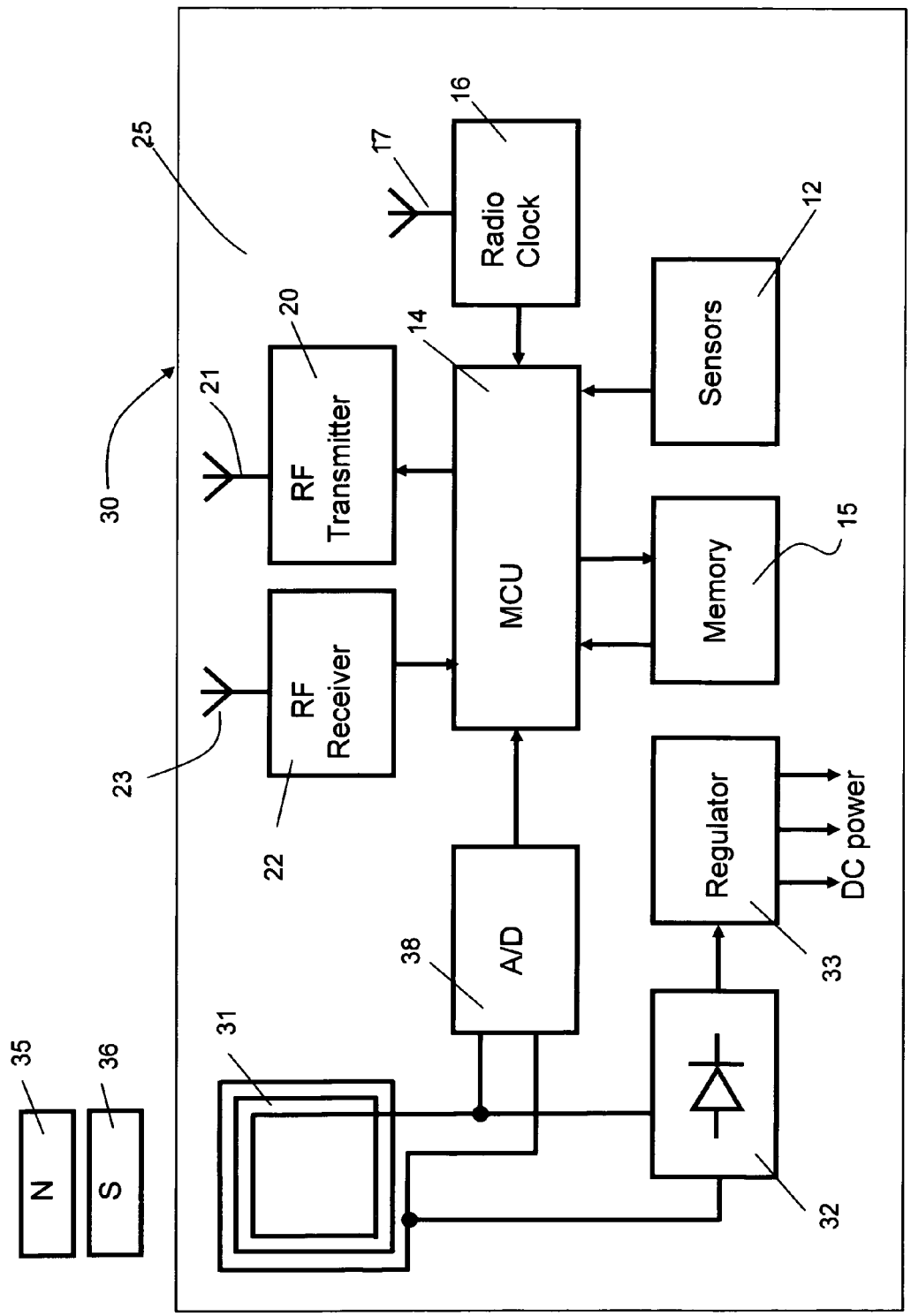
FIG. 2 is a schematic block diagram of a second embodiment of the invention.

FIG. 2 is a schematic block diagram of a second embodiment of the invention. Elements shown in FIG. 2 which are identical in structure and function to those shown in FIG. 1 bear the same reference numerals. The embodiment shown in FIG. 2 has the same advantages as the embodiment of FIG. 1, but offers additional advantages. As seen in this Fig., D.C. power unit 24 is replaced by an inductive D.C. power supply comprising a power coil 31, a voltage multiplier/rectifier circuit 32, and a voltage regulator circuit 33. Elements 31-33 have the structure and function of corresponding elements 35, 40, and 47 described in detail in commonly assigned, co-pending U.S. patent application Ser. No. 11/473,278 filed Jun. 6, 2006 for "Tire Parameter Monitoring System With Inductive Power Source", the disclosure of which is hereby incorporated by reference. In brief, a compound magnetic field produced by a pair of permanent magnets 35, 36 mounted in stationary fashion to a structural member of a vehicle (such as a suspension component or a fender) is cut by power coil 31 once per revolution of the tire to which the sensor unit 30 is affixed. This causes the inductive generation of current in power coil 31, which is conditioned by circuits 32 and 33 into appropriate D.C. electrical power for elements 12, 14, 15, 16, 20, and 22. This power generation arrangement eliminates the need for a battery, thereby reducing overall weight of the sensor unit 30 and ensuring a relatively long operational lifetime (since there is no finite storage battery).

In addition to this power improvement, the embodiment of FIG. 2 offers two additional advantages both of which are afforded by the addition of an analog-to-digital converter 38 having a pair of input terminals connected to opposite ends of power coil 31 and an output connected to an input of microcomputer 14. For each revolution of the associated tire, power coil 31 generates an analog electrical signal, which is converted to digital form by A/D converter 38 and supplied to microcomputer 14. Microcomputer 14 processes this signal in two ways. First, the appearance of each signal signifies one complete revolution of the associated tire. Thus, each signal can be processed by microcomputer 14 to maintain a running calculation of the total travel distance of, or total mileage traveled by, the associated tire. This eliminates the need for a separate input pulse from the vehicle mileage measuring system (e.g. the odometer pulse) and simplifies the installation procedure.

Second, each signal generated by power coil 31 is unique to the physical location of magnets 35, 36 on the vehicle. This concept is fully described in commonly assigned, co-pending U.S. patent application Ser. No. 11/893,803 filed Aug. 18, 2007 for "Tire Parameter Monitoring System With Sensor Location Using Magnetic Fields", the disclosure of which is hereby incorporated by reference. In brief, for a vehicle having four wheels and tires, a pair of magnets is positioned adjacent a wheel and tire at each of the four tire locations (right front, right rear, left front, and left rear). At each location, the magnets are arranged with unique magnetic orientation, so that the compound magnetic field generated by each magnet pair is unique to that location. When power coil 31 cuts the unique compound magnetic field generated by the adjacent magnet pair, a corresponding compound analog electrical signal is generated which is also unique. The compound analog electrical signal is converted to digital form by A/D converter 38 and supplied to microcomputer 14. Initially, when the tire is first installed at a particular location on the vehicle, microcomputer 14 stores the unique digital location signal in memory 15. Thereafter, microcomputer 14 compares current location signals with the originally stored digital location signal. If the signals match, the tire has not been moved to a new vehicle location. If the signals do not match, the new location signal is stored in memory 15 along with the real time information supplied by radio clock unit 16. If a table of location signals correlated to vehicle locations is created and stored in memory 15 (using r.f. receiver 22 and microcomputer 14), the new location signal can be compared with the location signals in the table and the actual physical new location of the tire can be ascertained. This capability eliminates the need to manually enter a tire location change into memory 15.

Figure 3:
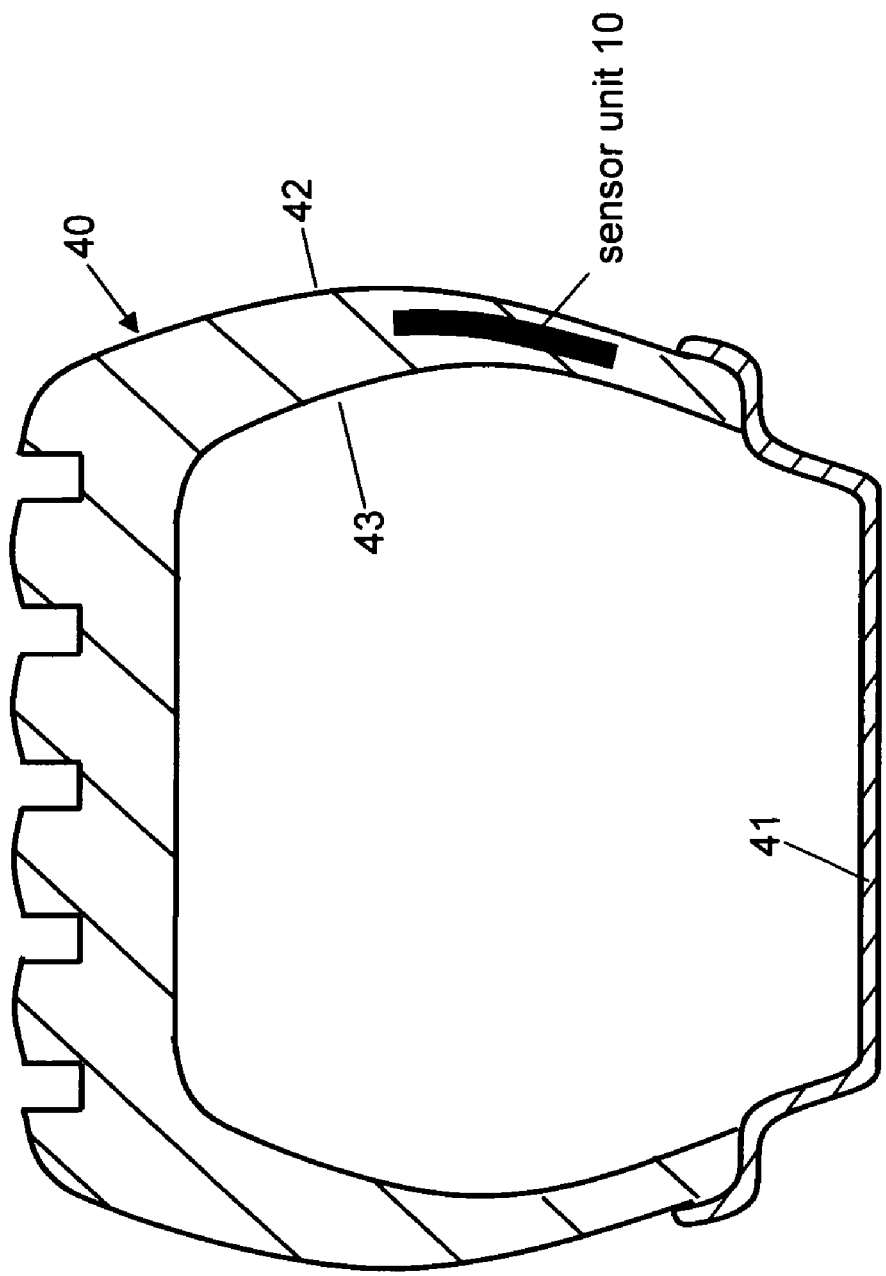
FIG. 3 is a sectional view through a vehicle wheel and tire illustrating a first internal placement of a sensor unit according to the invention wherein the sensor unit is mounted internally within the side wall of a vehicle tire.

FIG. 3 is a sectional view illustrating the placement of the tire parameter sensor unit 10 within an associated tire 40 mounted on a rim 41. As seen in this Fig., sensor unit 10 is molded into the interior of the tire between outer sidewall 42 and inner sidewall 43. Since the temperatures required for the tire molding process are relatively low compared to the temperature tolerance of the components of system 10, this internal placement is practical. The internal arrangement shown provides the maximum protection for the components of system 10 since they are entirely encased in the tire material.

Figure 4:
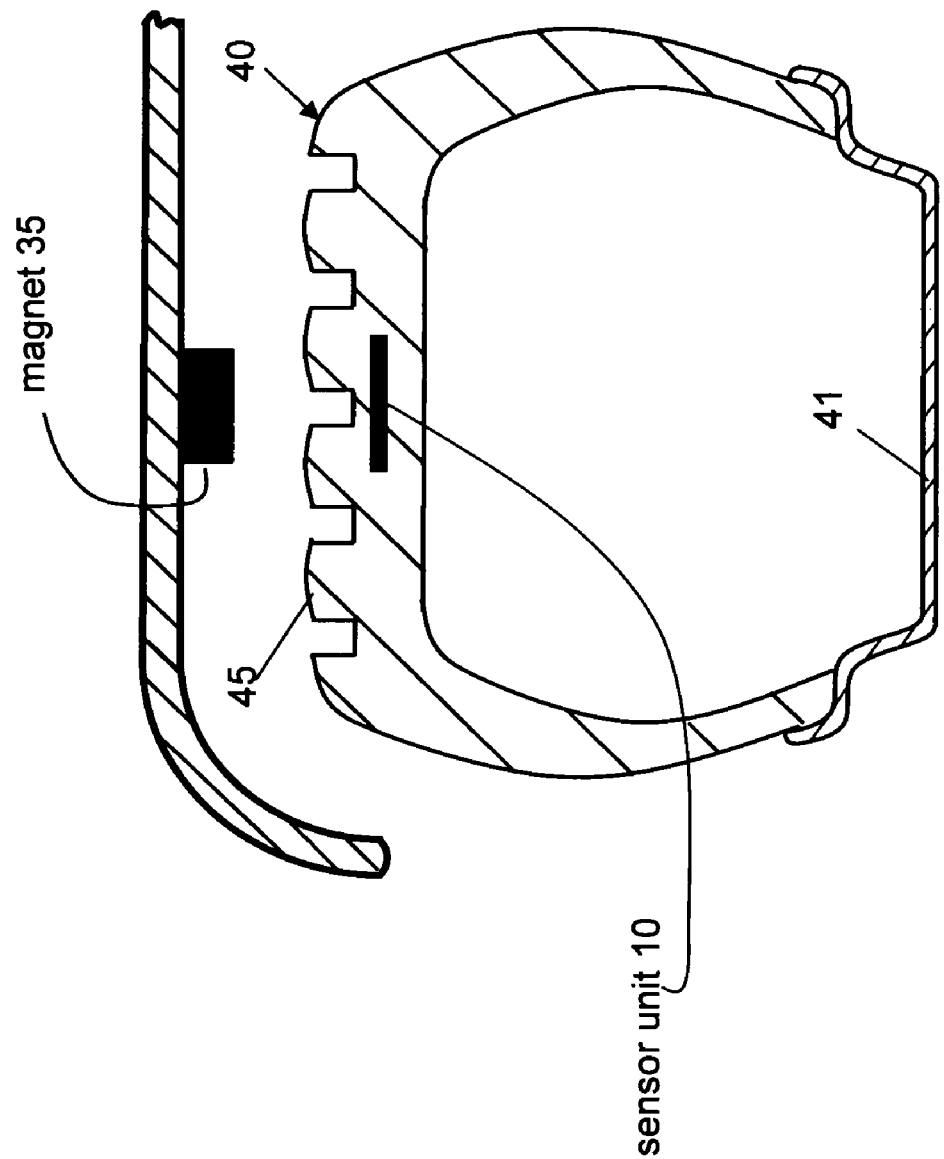
FIG. 4 is a sectional view through a vehicle wheel and tire illustrating a second internal placement of a sensor unit according to the invention wherein the sensor unit is mounted internally within the tread wall of a vehicle tire.

FIG. 4 is a sectional view through a vehicle wheel and tire illustrating a second internal placement of a sensor unit according to the invention wherein the sensor unit is mounted internally within the tread wall of a vehicle tire. As seen in this Fig., sensor unit 10 is embedded within the tread wall 45 of tire 40 mounted on rim 41. Since the temperatures required for the tire molding process are relatively low compared to the temperature tolerance of the components of system 10, this internal placement is practical. The internal arrangement shown provides the maximum protection for the components of system 10 since they are entirely encased in the tire material.

As will now be apparent, the invention provides a simple, low cost tire parameter sensor unit which is permanently attached to an associated tire and which accumulates the entire operational history of the tire from fabrication to disposal. In addition to the initial tire fabrication information, the invention also accumulates current measured operational characteristics of the tire on a real time basis. In one embodiment, the sensor unit also incorporates a tire mileage measurement capability, as well as a location monitor for noting each time the physical location of the associated tire is changed. As a consequence, the invention affords improved quality control and provides a permanent real time log of tire usage and physical condition.

While the invention has been described with reference to particular preferred embodiments, various modifications, alternate embodiments, and equivalents may be employed, as desired. For example, if the remote interrogation function is not needed in a given application, r.f. receiver 22 may be eliminated. In this modification, microcomputer 14 stores the operational information in memory 15 during the tire lifetime. This stored information can be extracted from memory 15 when the tire is exhausted by removing the sensor unit 10 from the tire carcass and connecting microcomputer 14 to a memory reading device. Therefore, the above should not be construed as limiting the invention, which is defined by the appended claims.

What is claimed is:

1. A tire parameter sensor unit for accumulating a vehicle tire history log of operational tire information during use, said sensor unit comprising:
    a substrate;
    a tire parameter sensor carried by said substrate for providing monitoring signals representative of the value of a tire parameter;
    a radio clock unit carried by said substrate for generating real time clock signals derived from time code signals transmitted by a time standard and received by an antenna;
    a memory carried by said substrate;
    a processor/transmitter unit carried by said substrate and coupled to said sensor and said radio clock unit for storing said monitoring signals in said memory along with said real time clock signals and for converting said monitoring signals to transmission signals; and
    a power system carried by said substrate for supplying electrical power to said tire parameter sensor, said radio clock unit, said memory and said processor/transmitter unit.

2. The invention of claim 1 further including a receiver unit coupled to said processor/transmitter unit for enabling remote interrogation of said memory.

3. The invention of claim 2 wherein processor/transmitter unit includes means for storing tire history information received by said receiver unit in said memory.

4. The invention of claim 1 wherein said power system includes a battery.

5. The invention of claim 1 wherein said power system includes an inductive power source having a coil for generating electrical current when said coil passes through a magnetic field.

6. The invention of claim 5 wherein said coil generates tire rotation analog pulse signals during tire motion; and wherein said sensor unit further includes an analog-to-digital converter having an input coupled to said coil and an output coupled to said processor/transmitter unit for converting said analog pulse signals to digital equivalent signals; and said processor/transmitter unit includes means for converting said digital equivalent signals to tire mileage information signals and means for storing said tire mileage information signals in said memory.

7. The invention of claim 1 wherein said sensor unit includes at least two tire parameter sensors carried by said substrate for providing monitoring signals representative of the value of at least two different tire parameters.

8. The invention of claim 1 further including a tire having a side wall; and wherein said tire parameter sensor unit is mounted within said side wall of said tire.

9. The invention of claim 1 further including a tire having a tread wall; and wherein said tire parameter sensor unit is mounted within said tread wall of said tire.

10. A method of creating a vehicle tire history log of operational tire information during use, said method comprising the steps of:
   (a) attaching a tire parameter sensor unit to a tire, the sensor unit having a substrate; a tire parameter sensor carried by the substrate; a radio clock unit carried by the substrate for generating real time clock signals derived from time code signals transmitted by a time standard and received by an antenna; a memory carried by the substrate; a processor/transmitter unit carried by the substrate and coupled to the sensor and the radio clock unit for converting signals received therefrom to transmission signals; and a power system carried by the substrate for supplying electrical power to the tire parameter sensor, the radio clock unit, the memory and the processor/transmitter unit;
   (b) applying electrical power from the power system to the tire parameter sensor, the radio clock unit, the memory, and the processor/transmitter unit;
   (c) operating the tire parameter sensor to generate monitoring signals representative of the value of a tire parameter;
   (d) operating the radio clock unit to generate real time clock signals from the time code signals; and
   (e) operating the processor/transmitter unit to store the monitoring signals in the memory along with the real time clock signals.

11. The method of claim 10 further including the step of operating the processor/transmitter unit to convert the monitoring signals to transmission signals.

12. The method of claim 10 further including the steps of providing initial tire identification information, and storing the initial tire identification information in the memory.

13. The method of claim 10 further including the steps of providing a coil for generating tire rotation analog pulse signals during tire motion; providing an analog-to-digital converter having an input coupled to the coil and an output coupled to the processor/transmitter unit for converting the analog pulse signals to digital equivalent signals; providing the processor/transmitter unit with means for converting the digital equivalent signals to tire mileage information signals and means for storing the tire mileage information signals in the memory; operating the analog-to-digital converter to produce the digital equivalent signals; operating the processor/transmitter unit to generate the tire mileage information signals; and operating the processor/transmitter unit to store the tire mileage information signals in the memory.

14. The method of claim 10 further including the steps of providing a receiver unit coupled to the processor/transmitter unit for enabling remote interrogation of the memory; and operating the receiver unit and the processor/transmitter unit to convert the monitoring signals and the real time clock signals stored in the memory to transmission signals.

15. The method of claim 10 further including the step of mounting the tire parameter sensor unit within the side wall of a vehicle tire.

16. The method of claim 10 further including the step of mounting the tire parameter sensor unit within the tread wall of a vehicle tire.

17. The method of claim 10 further including the steps of providing at least two tire parameter sensors carried by the substrate for providing monitoring signals representative of the value of at least two different tire parameters, and operating the at least two tire parameter sensors to generate monitoring signals representative of the value of at least two different tire parameters.

\* \* \* \* \*